_United States Patent_ [19]

Copp

[11] 3,970,374
[45] July 20, 1976

[54] OPTICAL VISUAL COMMUNICATION SYSTEM

[76] Inventor: John C. Copp, P.O. Box 167, Strasburg, Va. 22657

[22] Filed: May 15, 1975

[21] Appl. No.: 577,838

Related U.S. Application Data

[63] Continuation-in-part of Ser. No. 446,508, Feb. 27, 1974, abandoned.

[52] U.S. Cl. .............................. 350/301; 350/288; 35/8 R; 35/60
[51] Int. Cl.² ...................... G02B 5/08; G09B 1/00
[58] Field of Search ........... 350/301, 302, 288, 289, 350/292–296, 299, 303, 304, 25, 202; 35/58, 60, 8 R, 22 R; 353/98; 186/1 R, 1 C; 272/8 M, 8.5, 13

[56] References Cited
UNITED STATES PATENTS

| | | | |
|---|---|---|---|
| 1,338,615 | 4/1920 | Dysart et al. | 350/302 |
| 3,401,469 | 9/1968 | Shaver et a. | 35/60 |
| 3,402,262 | 9/1968 | Sollima | 353/98 |
| 3,462,855 | 8/1969 | Cornish | 35/60 |
| 3,763,963 | 10/1973 | Wisznia | 350/299 |

Primary Examiner—John K. Corbin
Assistant Examiner—Jon W. Henry
Attorney, Agent, or Firm—Cushman, Darby & Cushman

[57] ABSTRACT

An optical visual communication system especially adapted for a classroom setting. A plurality of first plane mirrors are oriented over a plurality of student desks in a classroom. A second plane mirror is oriented in the visual field of an instructor or teacher. The first plane mirrors reflect images from their respective student desks to the second plane mirror which in turn reflects these visual images to the eye of an instructor. Since there are two reflections between the students' desks and the eye of the teacher, the visual images are not reversed. Various embodiments of mounting means for mounting the first plane mirrors are disclosed, including flexible arms and clamps secured to a grid network carried by and suspended from the ceiling of a classroom. One embodiment also shows the use of magnifying elements.

13 Claims, 8 Drawing Figures

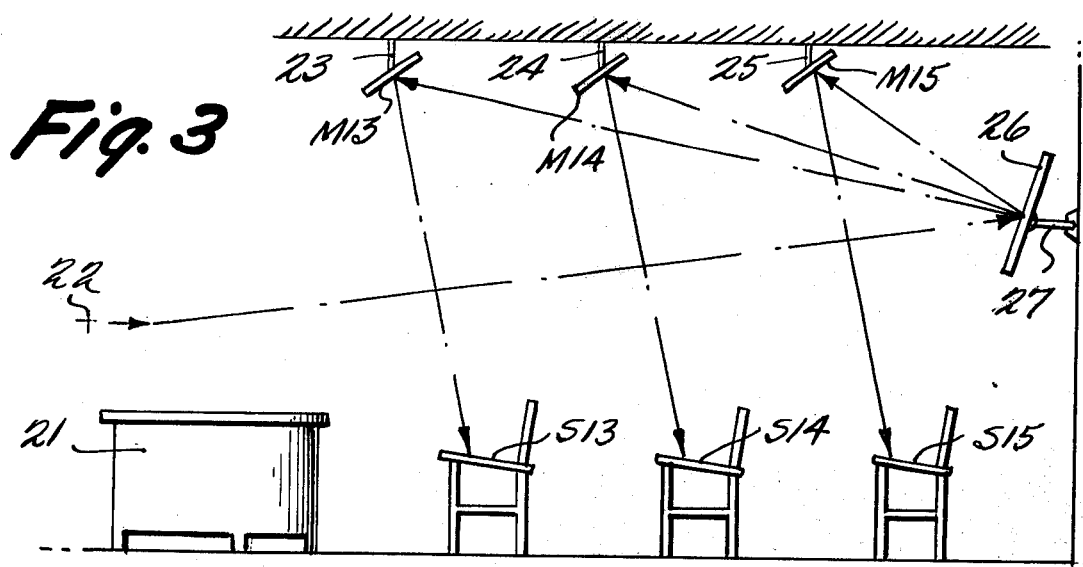
Fig. 3
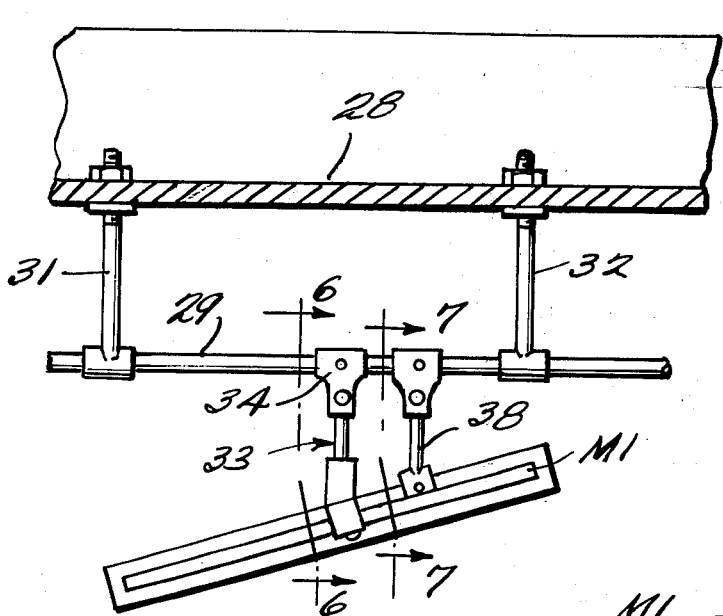
Fig. 4
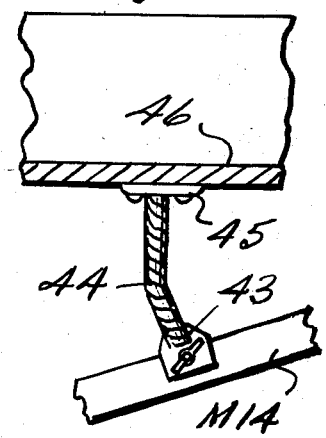
Fig. 5
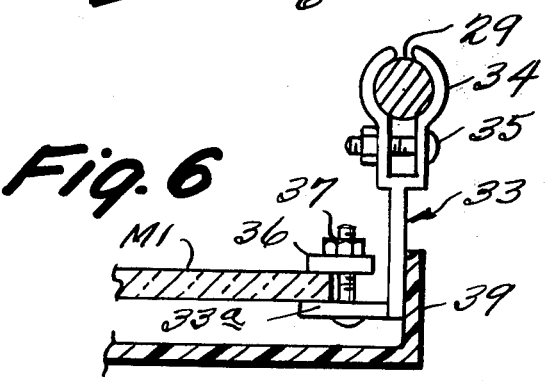
Fig. 6
Fig. 7

OPTICAL VISUAL COMMUNICATION SYSTEM

BACKGROUND OF THE INVENTION

This application is a continuation-in-part of application Ser. No. 446,508, filed Feb. 27, 1974, now abandoned.

This invention pertains to a visual communication system and, more particularly, pertains to a visual communication system for providing visual communication between a single, central location and a plurality of remote locations.

In the field of education it has been recognized that the learning process is enhanced by providing a greater amount of and faster feedback for communication between a student and a learning or monitoring source. Thus, for example, systems have been proposed wherein students are provided with a computer terminal and an appropriate computer system functions as a programmed learning source, with these being essentially instantaneous feedback to the student regarding wrong answers or approaches, etc. Computers are, of course, quite expensive and there is an inherently great flexibility in having an instructor rather than a computer function as a learning source and/or monitor.

In order to enhance the learning process utilizing an instructor, there is a need for faster and better communication between an instructor and the plurality of students in a typical classroom setting.

OBJECTS AND SUMMARY OF THE INVENTION

It is, therefore, an object of this invention to provide a visual communication system for providing visual communication between a central location and a plurality of remote locations.

More specifically, it is an object of this invention to provide a visual communication system for enabling an instructor to view the working surfaces of a plurality of student desks in a classroom.

It is another object of this invention to provide a system of the above character which is reliable and relatively inexpensive to implement.

BRIEF DESCRIPTION OF THE INVENTION

Briefly, in accordance with one embodiment of the invention, an optical system is provided for use in a classroom having an instructor's desk and a plurality of student desks for providing visual communication between the instructor and the plurality of students. The optical system includes a plurality of first plane mirrors with mounting means being provided for mounting each of the first plane mirrors above a corresponding one of the students' desks. A second plane mirror is provided with mounting means mounting the second plane mirror in the visual field of an instructor situated, for example, at the instructor's desk. Each of the first plane mirrors are oriented in a predetermined plane for reflecting a visual image of activity on the working surface of its associated student desk to the second plane mirror. The second plane mirror is oriented to reflect the plurality of images of activity at the students' desks into the visual field of an instructor.

BRIEF DESCRIPTION OF THE DRAWINGS

FIG. 3 is a side elevational view of another embodiment of an optical communication system in accordance with the invention.

FIG. 4 is a schematic illustration of one arrangement for mounting mirrors in a classroom setting.

FIG. 5 is a schematic cross-sectional view of another arrangement for mounting mirrors to the ceiling of a classroom.

FIG. 6 is a sectional view of the arrangement of FIG. 4 taken along the line 6—6 thereof.

FIG. 7 is a sectional view of the arrangement of FIG. 4 taken along the line 7—7 thereof.

DESCRIPTION OF THE PREFERRED EMBODIMENTS

Figure 1:
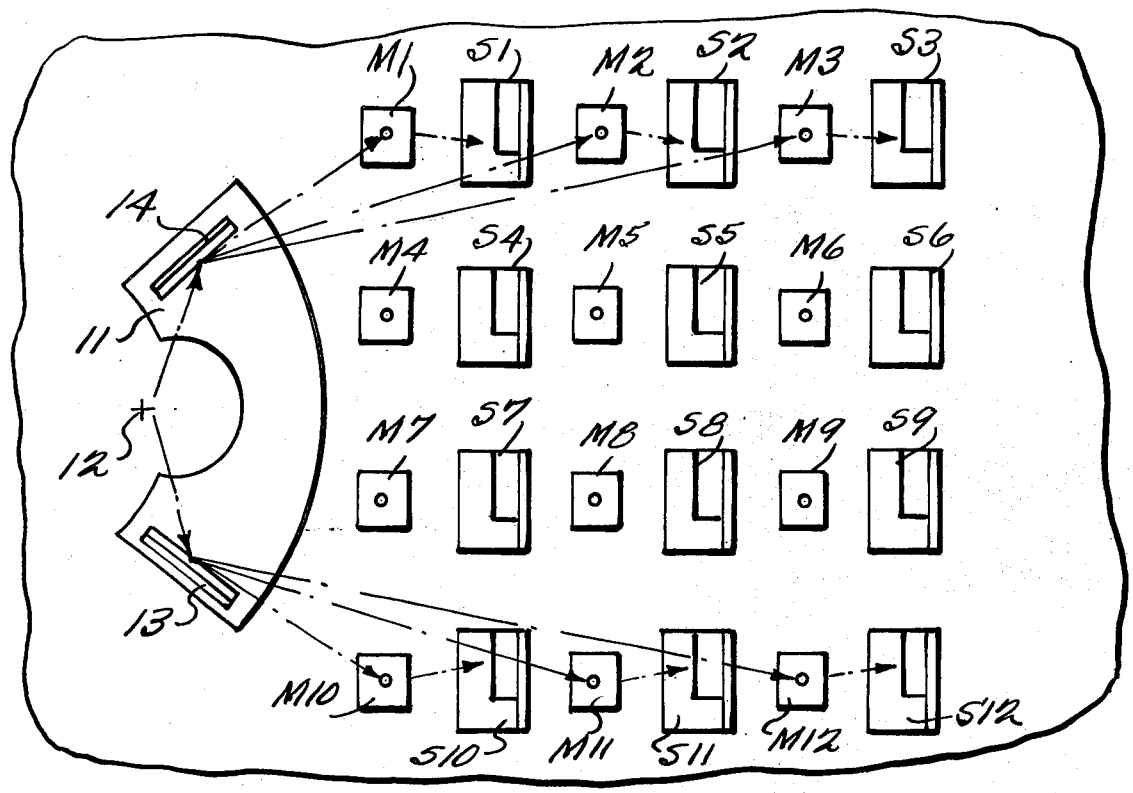
FIG. 1 is a schematic top view, looking down from the ceiling on a typical classroom setting, illustrating an optical system in accordance with the invention.
Figure 2:
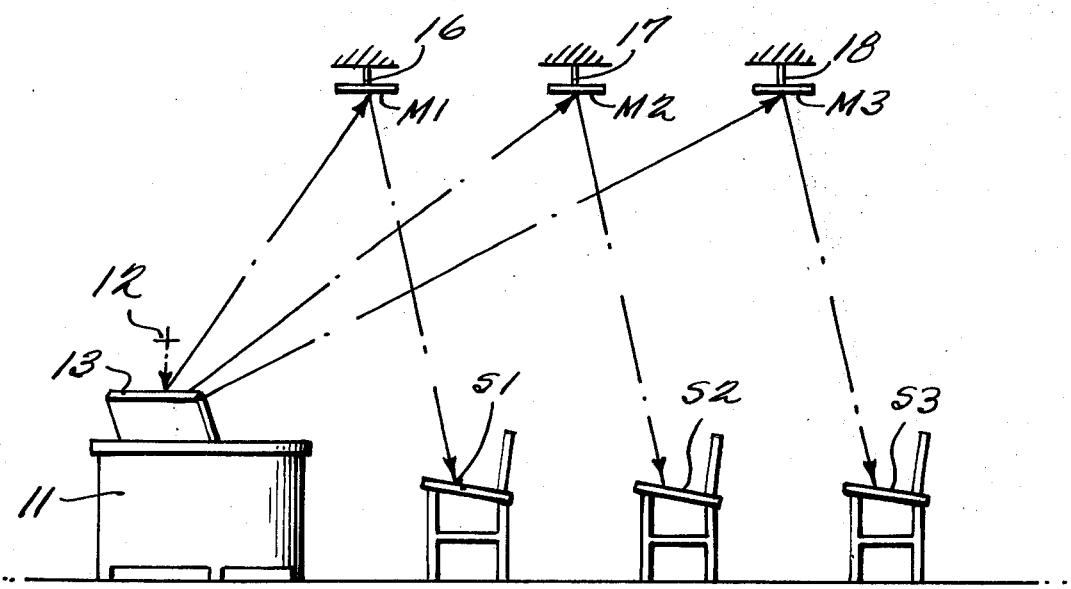
FIG. 2 is a side elevational view in schematic form of the optical system shown in FIG. 1.

Turning now to a consideration of the drawings and in particular, FIGS. 1 and 2, there is diagrammatically shown an embodiment of the invention as applied in a typical classroom setting for providing visual communication between an instructor and a plurality of students. In the typical classroom setting illustrated there is provided an instructor's desk 11 with the position of an instructor with respect thereto indicated by the point labeled with reference numeral 12. Distributed about the classroom are a plurality of student desks which are illustrated as being twelve and are denoted by reference numerals S1 through S12, respectively. A plurality of first plane mirrors are provided, one for each of the student desks and which are labeled with the reference indications M1 through M12 in FIG. 1. In accordance with one embodiment of the invention, two plane mirrors 13 and 14 are provided mounted on the instructor's desk 11 and arranged in the visual field of the instructor position at point 12.

The first plane mirrors M1 through M6 which are associated with the respective student desks S1 through S6 are oriented so as to reflect a visual image of the work surface of the associated student desks to the mirror 14. The mirror 14 in turn reflects the visual images of the work surface areas of the student desks S1 through S6 into the visual field of an instructor at point 12. In a similar fashion the first plane mirrors M7 through M12 reflect a visual length of the work surface areas of the student desks S7 through S12 with which they are associated to the plane mirror 13 which in turn reflects these visual images to an instructor at point 12. Each of the first plane mirrors associated with the student desks forms a reversed image of whatever occupies the work surface of the student desk. The plane mirrors on the instructor's desk reverse the reversed images so that the instructor sees a nonreversed image of whatever occupies the work surface of the student desks. In this manner, one instructor can monitor a plurality of students and can observe written material on the student desks or physical manipulations and the like by students of objects upon the student desks. By being able to observe activity on the work surface of a plurality of student desks, an instructor can provide rapid feedback to the student as to whether the student is doing something in a correct fashion or is approaching a particular position problem in the correct manner.

Of course, if desired, the orientation of the mirrors 13 and 14 could be altered such that the mirror 13 reflected the images from the mirrors of the opposite half of the room, i.e., mirrors M1 through M6 with the mirror 14 reflecting the images from the mirrors M7 through M12. This arrangement does have a relative disadvantage compared to the arrangement illustrated in FIG. 1, however, in that an instructor looks to the mirror on the instructor's left to observe material or manipulations on the desk of a student physically located to the instructor's right.

The mirrors discussed above in connection with FIG. 1 need not, of course, necessarily be common silvered glass. They may be constructed of any suitable reflecting material such as a metal, mylar or other plastic material and the like.

It should also be understood that it is within the purview of this invention to provide visual image pick-up means, such as a television camera, for example, at the point 12 in the arrangement of FIG. 1, with an observer located at a remote corresponding television receiver. Thus, the central location or point 12 can be a human eye, a television camera or any other kind of visual image sensing means.

FIG. 2 is a side elevational view in schematic form of a portion of the visual communication system diagrammatically illustrated in FIG. 1. FIG. 2 shows the first plane mirrors M1, M2 and M3 are being suitably attached by mounting means schematically illustrated and denoted by reference numerals 16, 17 and 18, to the ceiling of a classroom. Each of the mirrors M1, M2 and M3 are oriented so as to reflect a visual image of whatever occupies the work surface of their associated student desks S1, S2 and S3, respectively, to the mirror 14 situated on the instructor's desk 11. As described above, the mirror 14 reflects the visual images from the mirrors M1, M2 and M3 (along with visual images from other mirrors, for example) into the visual field of an instructor whose eye, for example, might be positioned at the point 12.

The physical dimensions of the first plane mirrors M1, M2, etc. and the physical dimensions of the mirrors 13 and 14 provided on the instructor's desk depend, of course, on the particular parameters of any given application of a visual system in accordance with the invention. In accordance with one embodiment of the invention, each of the mirrors M1 through M2 were formed to have a surface area of approximately one square foot and each of the mirrors 13 and 14 situated on the instructor's desk were formed to have a surface area of approximately 2 square feet. Also, of course, a greater or lesser number of 12 student desks and associated first plane mirrors may be provided. The practical limit to the number of student desks which can be monitored from one instructor location depends primarily upon the length of travel of the light rays forming the visual image from the student desk to the position of the instructor. That is, the further the visual images travel from the student desks to the instructor, the less detail an instructor will be able to observe because of the reduced size of the image.

Turning now to a consideration of FIG. 3, there is shown a side elevational view somewhat similar to FIG. 2 but illustrating another embodiment of a visual communication system in accordance with applicant's invention. As before, in this embodiment there is provided an instructor's desk 21 with which an instructor position is indicated by the point labeled with reference numeral 22. A plurality of student desks illustrated schematically by the desks labeled S13, S14 and S15 are provided in the classroom. A plurality of first plane mirrors, indicated by reference numerals M13, M14 and M15, one for each of the student desks, are provided. The first plane mirrors M13, M14 and M15 are diagrammatically illustrated in FIG. 3 as being suitable attached to a classroom ceiling by mounting means 23, 24 and 25, respectively. A single second plane mirror 26 is suitably mounted by mounting means diagrammatically illustrated by means 27 to the rear of the classroom. Each of the mirrors M13, M14 and M15 respectively reflect a visual image of the work surface of their associated student desks S13, S14 and S15 to the second plane mirror 26. The second plane mirror 26 in turn reflects these images into the visual field at point 22 of an instructor. As was the case in the embodiment discussed in connection with FIGS. 1 and 2, there are provided two successive reflections of the work surface of the students' desks so that a nonreversed image is seen by the instructor.

It should be pointed out in connection with a visual communication system such as described in connection with the FIGS. 1 through 3, that such a visual communication system is symmetrical. That is, in accordance with the visual communication system as provided by applicant, not only can visual images of the students' desks be reflected into the field of view of the instructor, but also visual images may be transmitted from the position of the instructor through the same arrangement of mirrors back to the individual student desks. Thus, in FIG. 1, for example, an object held up at point 12 is reflected by the mirrors 13 and 14 to the associated ones of the first plane mirrors and down into the visual field of the students at the desks associated with the respective plane mirrors.

Turning now to a consideration of FIG. 4, there is shown in cross-sectional diagrammatic form an illustration of one embodiment of mounting means for the first plane mirrors provided in accordance with this invention. In accordance with this embodiment a ceiling structure indicated by reference numeral 28 supports a network or grid of tubular members to which the first plane mirrors may be mounted. Thus, in FIG. 4 the ceiling 28 mounts a tubular member 29 by means of the threaded rod assemblies 31 and 32. A mounting means 33 includes a clamp portion 34 with an associated bolt and nut assembly 35 for releasably securing the clamp means 33 to the tubular member 29. The clamping means 33 also has at its other end a clamp assembly including a clamping member 36 together with an associated bolt and nut assembly 37 for clamping one of the first plane mirrors, such as the mirror M1, between the clamping member 36 and a clamping surface 33a so as to mount and support the mirror M1. A plurality of the clamping means 33 (two to four, for example) may be provided for mounting each of the mirrors, such as mirror M1, to provide a firm and secure support therefor.

In accordance with some embodiments of applicant's invention, an additional clamping means 38 may be provided for mounting a shatterproof shield 39 (made of plexiglass, for example) in a shielding relationship with the mirror M1. Such a mounting means 38, an specifically illustrated in FIG. 7, includes a clamp portion 38a with an associated bolt and nut assembly 41 for releasably securing the clamp assembly 38 to the tubular member 29. A bolt and nut assembly 42 is also provided extending through an aperture provided in a side of the plexiglass shield 39 for securing the shield 39 to the clamping member 38. The purpose of such a shield 39 made of plexiglass, for example, is to provide an impact-absorbing barrier for separating the first plane mirrors suspended over students' desks from the students below. Thus, the first plane mirrors could not be shattered by objects thrown at them and if they should shatter for some reason, the shield 39 would prevent pieces of the broken mirrors from falling down on the students below. Such a shield arrangement would of course not be needed where the mirrors themselves are made of materials not prone to shattering, such as metal, mylar or other plastic material and the like, as discussed above.

Alternate arrangements for mounting the first plane mirrors suspended from a classroom ceiling are, of course, possible. Utilizing the arrangement illustrated in FIGS. 4, 6 and 7, with a grid to which the mirrors may be releasably secured and along which they may be adjusted, does permit some flexibility in shifting the position of the mirrors in a classroom. An alternate arrangement is shown in FIG. 5, however, in which a mirror M14 is captured by and supported by a clamping means 43. The clamping means 43 is attached to one end of a flexible arm 44 with the other end of the flexible arm 44 being permanently attached by a mounting plate 45 to the ceiling structure 46 of a classroom. The flexible arm 44 can be of the common type which can be displaced by the force of moving the mirror M14 but which, in the absence of any force applied to the mirror M14, will hold the mirror M14 in the position to which the mirror has been moved.

Alternate arrangements are, of course, possible. Thus, for example, the grid network as diagrammatically illustrated in FIG. 4 might be utilized with flexible arms, such as illustrated in FIG. 5, being suitably secured (releasably by clamping means, for example) to the grid network.

Of course, rather than being secured to the ceiling, the plurality of first plane mirrors can be secured to supports extending upwardly from the student desks or can, for example, be secured to supports mounted on rollers, which supports on rollers can be positioned immediately adjacent each of the student desks.

Figure 8:
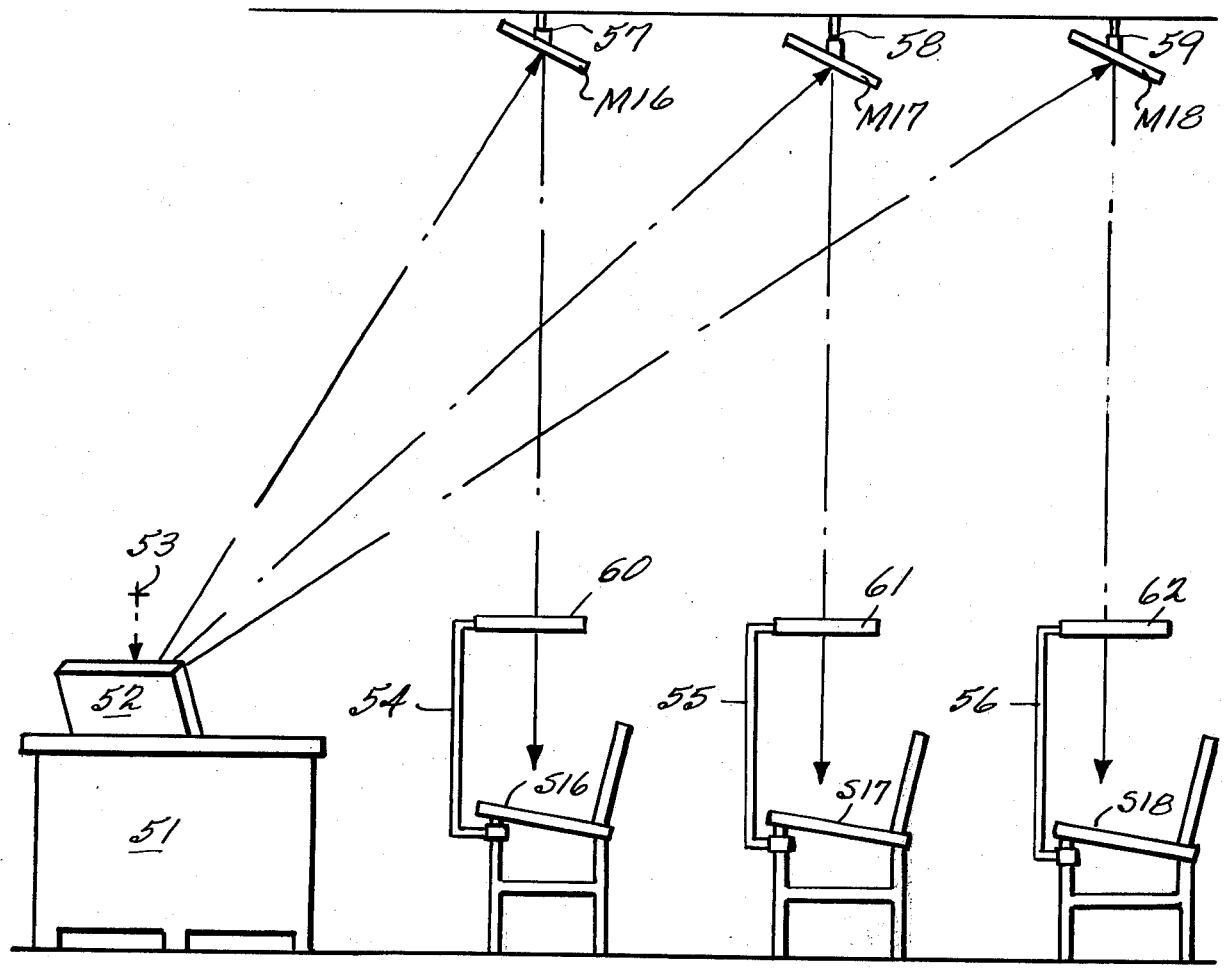
FIG. 8 is a side elevational view of another embodiment of the invention.

Turning now to FIG. 8, there is shown a side elevation similar to FIG. 2 and illustrating an alternate embodiment of the invention utilizing magnifying means. In FIG. 8, there is illustrated three typical student desks S16, S17 and S18. An instructor's desk 51 is provided having one or more plane mirrors 52 positioned thereon. The reference point 53 refers to image pickup means such as an instructor's eye, a television camera or the like.

A plane mirror is associated with each of the student desks S16, S17 and S18. In FIG. 8, three plane mirrors M16, M17 and M18 are illustrated, with each of these mirrors being suitably mounted above the respective student desks with which they are associated. These mirrors can be mounted in any desired fashion such as on floor stands or by attachment to the ceiling. FIG. 8 diagrammatically illustrates the mirrors as attached to the ceiling by mounting means 57, 58 and 59. Each of the mirrors M16, M17 and M18 is suitably mounted on its mounting means so as to be adjustable and is oriented so as to reflect to the mirror 52 whatever appears on the student desks S16, S17, S18, etc. with which the mirrors are associated.

The arrangement shown in FIG. 8 is also illustrative of that aspect of the invention wherein magnifying means are included. As mentioned previously, the further that visual images travel from student desks to an instructor, the less detail an instructor will be able to observe because of the reduced size of the image. By incorporating magnifying means in an arrangement according to the invention, an instructor is able to observe more detail on a student's desk than would otherwise be the case. In FIG. 8 stands 54, 55 and 56 suitably respectively attached to the student desks are used to mount magnifying elements 60, 61 and 62. As shown in FIG. 8, the magnifying elements are positioned some distance above the student desks, 2 to 3 feet for example. The magnifying elements 60, 61 and 62 can be formed of any suitable magnifying arrangement, such as a lens or a Fresnel concentric ring sheet. These magnifying elements form magnified images of the work areas of the student desks, which magnified images are reflected by mirrors M16, M17 and M18 to the mirror 52. An instructor is thus able to observe more detail on the student desks because of the magnification.

The particular arrangement in FIG. 8 is illustrative of only one of the possible embodiments of the invention including magnifying elements. Instead of being interposed optically between the student desks and the first plane mirrors above the desks, they might instead be interposed optically between the first plane mirrors and the plane mirrors adjacent the instructor's desk. Both the plane mirrors and magnifying elements may be mounted to stands beside the student desks or to the ceiling. Alternatively, the magnifying elements may be mounted to stands with the mirrors mounted to the ceiling. Further, it should be understood that in accordance with the invention only some of the student desks (such as only those a long distance from the observation point 53) may be provided with magnification means. These and other variations may be made without departing from the spirit and scope of the invention.

What is claimed is:

1. An optical system for use in a classroom having an instructor's desk and a plurality of student desks for providing visual communication between an instructor and a plurality of students comprising a plurality of first plane mirrors, mounting means for mounting each f said first plane mirros physically above one of the student desks, a second plane mirror, mounting means for mounting said second plane mirror in visual alignment with the position of an instructor at the instructor's desk, each of said first plane mirrors being oriented in a predetermined plane for reflecting a visual image of activity at its associated student desk to said second plane mirror, said second plane mirror being oriented to reflect the plurality of images of activity at the student desks into the visual field of and instructor at the instructor's desk.

2. An optical system as in claim 1 in which said second plane mirror is disposed physically closer to the instructor's desk than said first plane mirrors.

3. An optical system as in claim 1 in which said second plane mirror is disposed at the rear of the plurality of student desks and the instructor's desk is disposed at the front of the plurality of student desks.

4. An optical system as in claim 2 including two of said second plane mirrors disposed one to either side of the position of an instructor at the instructor's desk and both of said second plane mirrors being physically closer to the instructor's desk than said first plane mirrors, each of said second plane mirrors reflecting images from approximately one-half of said first plane mirrors associated with the respective student desks into the visual field of the instructor.

5. An optical system as in claim 1 in which said mounting means for said plane mirrors comprises a plurality of flexible arms, one for each of said first plane mirrors, each of said flexible arms being secured to a classroom ceiling and adjustably mounting one of said first plane mirrors.

6. An optical system as in claim 1 in which a shatter-resistant, transparent cover is also provided and is mounted adjacent each of said first plane mirrors, said transparent covers extending across the respective first plane mirrors underneath same to provide a physical barrier between the first plane mirrors and the underlying student desks.

7. An optical system as in claim 1 wherein said mounting means for said first plane mirrors comprise a grid of tubular members suspended by and supported from the ceiling, and including individual support clamps for each of said first plane mirrors, each of said support clamps including means for adjustably securing one of said plane mirrors to one end thereof and including clamp means at an opposite end thereof adapted to be releasably secured to any of said tubular members in the grid network.

8. An optical system as in claim 7 including a transparent physical barrier for each of said first plane mirrors, each of said transparent physical barriers being provided with supporting means having clamp means at one end for releasably securing said transparent physical barriers to a tubular member in the grid network and having securing means at the opposite end of the supporting means for mounting said transparent physical barriers so that they extend underneath each of the first plane mirrors for providing a physical barrier between the first plane mirrors and the underlying student desks.

9. An optical system in accordance with claim 1 wherein said mounting means for said first plane mirrors comprise stands adjacent said student desks, one stand for each student desk, each of said stands having an arm for mounting one of said first plane mirrors above its associated student desk.

10. An optical system in accordance with claim 1 including a plurality of magnifying elements with each magnifying element associated with one of said plane mirrors and optically aligned therewith, so that magnified images of activity at the student desks are reflected to the second plane mirror.

11. An optical system in accordance with claim 10 wherein means are provided for mounting said magnifying elements between the student desks and said first plane mirrors.

12. An optical system in accordance with claim 10 wherein means are provided for mounting said magnifying elements between said first plane mirrors and said second plane mirror.

13. An optical system as in claim 1 in which said second plane mirror is disposed physically more distant from the instructor's desk than said first plane mirrors, but in visual alignment with the position of an instructor at the instructor's desk.

* * * * *